United States Patent
Friedrich et al.

(10) Patent No.: US 7,232,542 B2
(45) Date of Patent: Jun. 19, 2007

(54) PREHEATING COLD BLAST AIR OF A BLAST FURNACE FOR TEMPERING THE HOT BLAST TEMPERATURE

(75) Inventors: Michael Friedrich, Pittsburgh, PA (US); Robert D'Arrigo, Bridgeville, PA (US)

(73) Assignee: Aker Kvaerner Metals, Inc., Pittsburgh, PA (US)

( * ) Notice: Subject to any disclaimer, the term of this patent is extended or adjusted under 35 U.S.C. 154(b) by 519 days.

(21) Appl. No.: 10/818,440

(22) Filed: Apr. 5, 2004

(65) Prior Publication Data

US 2004/0222574 A1 Nov. 11, 2004

(51) Int. Cl.
*C21B 13/00* (2006.01)
*C21B 11/02* (2006.01)

(52) U.S. Cl. .................. 266/44; 266/197; 266/144; 432/214

(58) Field of Classification Search ............ 266/44, 266/197, 144; 432/214
See application file for complete search history.

(56) References Cited

U.S. PATENT DOCUMENTS

| | | | | |
|---|---|---|---|---|
| 1,689,042 A * | 10/1928 | McGee | ......................... | 432/214 |
| 4,311,456 A | 1/1982 | Kletch | .......................... | 432/30 |
| 4,492,568 A | 1/1985 | Palz | ............................. | 432/30 |
| 5,044,940 A | 9/1991 | Knight, Jr. | .................. | 432/30 |
| 5,137,566 A | 8/1992 | Stephens, Jr. et al. | ........ | 75/507 |
| 5,474,280 A | 12/1995 | Martin | ....................... | 266/140 |
| 5,500,034 A | 3/1996 | Martin | ........................ | 75/505 |
| 5,582,036 A | 12/1996 | Drnevich et al. | ............. | 62/656 |
| 6,026,657 A | 2/2000 | Magnet et al. | ................ | 62/643 |
| 6,090,182 A | 7/2000 | Riley | ........................... | 75/460 |
| 6,464,928 B1 | 10/2002 | Lipukin et al. | ............. | 266/148 |

* cited by examiner

*Primary Examiner*—Scott Kastler
(74) *Attorney, Agent, or Firm*—Duane Morris LLP (57) ABSTRACT

An improved blast furnace system for producing molten iron incorporating a preheater to heat the cold blast air used to temper the hot blast temperature is disclosed. The improved blast furnace system comprises a blast furnace, a hot blast main for conveying a supply of hot blast to the blast furnace, a plurality of stoves for heating a supply of cold blast and generating the hot blast, a cold blast main for conveying a supply of cold blast to the plurality of stoves, and at least one cold blast preheater for heating a portion of the cold blast, that has been diverted to the preheater, into heated air and the heated air is mixed with the hot blast to temper the hot blast temperature.

18 Claims, 12 Drawing Sheets

PREHEATING COLD BLAST AIR OF A BLAST FURNACE FOR TEMPERING THE HOT BLAST TEMPERATURE

FIELD OF THE INVENTION

The present invention relates to a blast furnace system for producing molten iron. More particularly, the present invention relates to an improved blast furnace system incorporating a preheater to heat the cold blast air used to temper the hot blast temperature and to methods of tempering the hot blast temperature using preheated cold blast air.

BACKGROUND OF THE INVENTION

In a blast furnace system, a plurality of blast furnace stoves is operated at time-displaced cycles to heat a blast of air used to provide heat for a blast furnace. In each stove, there is a vertical combustion chamber coupled to a burner to inject gas, usually excess blast furnace gas, and air into the bottom portion of the chamber for combustion. Each stove is alternately on gas (being heated by combustion of the blast furnace gas) or on blast (heating the cold blast air). The combustion products are directed by a dome from the top of the combustion chamber into a regenerator through passageways in a filling of refractory checkerbrick to heat the blast of air. The blast of air usually flows through the openings in the checkerbrick countercurrent to the flow of combustion gases.

Generally, the heated air is withdrawn through an opening in the side wall of the combustion chamber. In such a blast furnace stove, the burner is usually arranged to direct the flame horizontally into the bottom of the vertically extending combustion chamber. A water-cooled burner valve opens and closes the passageway from the stove gas burner into the combustion chamber and provides thermal protection for the metal parts of the burner.

Typical blast furnace systems operate continuously for many years. But in many blast furnace systems the blast furnace stoves begin to deteriorate long before the end of the blast furnace campaign itself. Deteriorating blast furnace stoves' heating capacity will diminish and as a result the hot blast air supplied to the blast furnace will not be sufficiently hot for optimal operation of the blast furnace. This deterioration of the stoves require the blast furnace to burn more fuel to compensate for the lower hot blast temperature but after a certain level of deterioration of the stoves, the stoves must be repaired. The refractory work in the stove becomes plugged either from dirt in the blast furnace gas combustion products or falling and crumbling brickwork. The plugging reduces heat transfer surface area. The heat transfer efficiency of combustion flue gas heating the brick as well as the hot refractory heating the cold blast air diminishes as the refractory system becomes plugged. The net result is a lower hot blast temperature. In order to maintain the same production at the blast furnace more fuel must be added to the blast furnace. The fuel can be in the form of additional metallurgical coke with the top solid charging or by fossil fuels that are added near the hot blast tuyeres. The stoves may consume less fuel during heating. But, repairs to a stove generally can be carried out only after the stove is cooled to near ambient temperature, which means that the stove can not be operating. This long interruption to the operation of the stove substantially affects the blast furnace's economical operation.

Thus, an improved blast furnace system is desired.

SUMMARY OF THE INVENTION

According to an aspect of the present invention, an improved blast furnace system for producing molten iron incorporating a preheater to heat the cold blast air used to temper the hot blast temperature is disclosed. The blast furnace system according to one embodiment of the present invention comprises a blast furnace, a hot blast main for conveying a supply of hot blast to the blast furnace, a plurality of stoves for heating a supply of cold blast and generating the hot blast, a cold blast main for conveying a supply of cold blast to the plurality of stoves, and at least one cold blast preheater. The preheater may continuously heat a portion of the cold blast, that has been diverted to the preheater, into heated air and the heated air is mixed with the hot blast to temper the hot blast temperature.

A typical blast furnace system has a plurality of stoves, generally three, for heating cold blast air for providing a supply of hot blast air to the blast furnace. In the method according to an embodiment of the present invention, a preheater is used to supplement the stoves for heating the blast furnace. The preheater may be a continuously fired heat exchanger and at least one preheater is provided to supplement the heating capacity of the stoves. Preferably the preheater would be connected to the blast furnace system in parallel with the plurality of stoves between the blast furnace system's cold blast main and the hot blast main. A supply of fuel is continuously combusted in the preheater to provide a continuous feed of hot combustion gases. A portion of the cold blast air from the cold blast main is diverted and continuously fed to the preheater wherein the diverted cold blast air is heated in the preheater using the hot combustion gases to produce heated air and the heated air is conveyed to the blast furnace's hot blast system.

According to another aspect of the present invention, a method for tempering the hot blast temperature of a blast furnace system where the blast furnace system comprises a plurality of stoves for heating cold blast air for providing a supply of hot blast air to the blast furnace is disclosed. The method comprises the steps of providing at least one preheater to supplement the stoves, continuously combusting a supply of fuel in the preheater to provide a continuous feed of hot combustion gases inside the preheater, diverting a portion of the cold blast air to provide a continuous feed of cold blast air to the preheater, wherein the diverted cold blast air is heated in the preheater by the hot combustion gases, and conveying the heated air to the blast furnace system's hot blast system.

The present invention is of most interest to those sites where excess blast furnace gas is being flared and the stove performance is deteriorating. The invention is a viable option for raising hot blast temperature and extending stove life when there is not sufficient economic incentive to repair the stoves. The preheater may be built while the blast furnace continues to operate and the capital cost may be less than the cost of a new stove. The present invention may also reduce the cost of producing molten metal at the blast furnace by recycling the lost energy of flared blast furnace gas or other wasted fuels back into iron production.

BRIEF DESCRIPTION OF THE DRAWINGS

The features illustrated in the above drawings are schematic and are not drawn to scale. Like reference numbers are used in the various drawings to represent like parts.

DETAILED DESCRIPTION OF THE INVENTION

Figure 1:
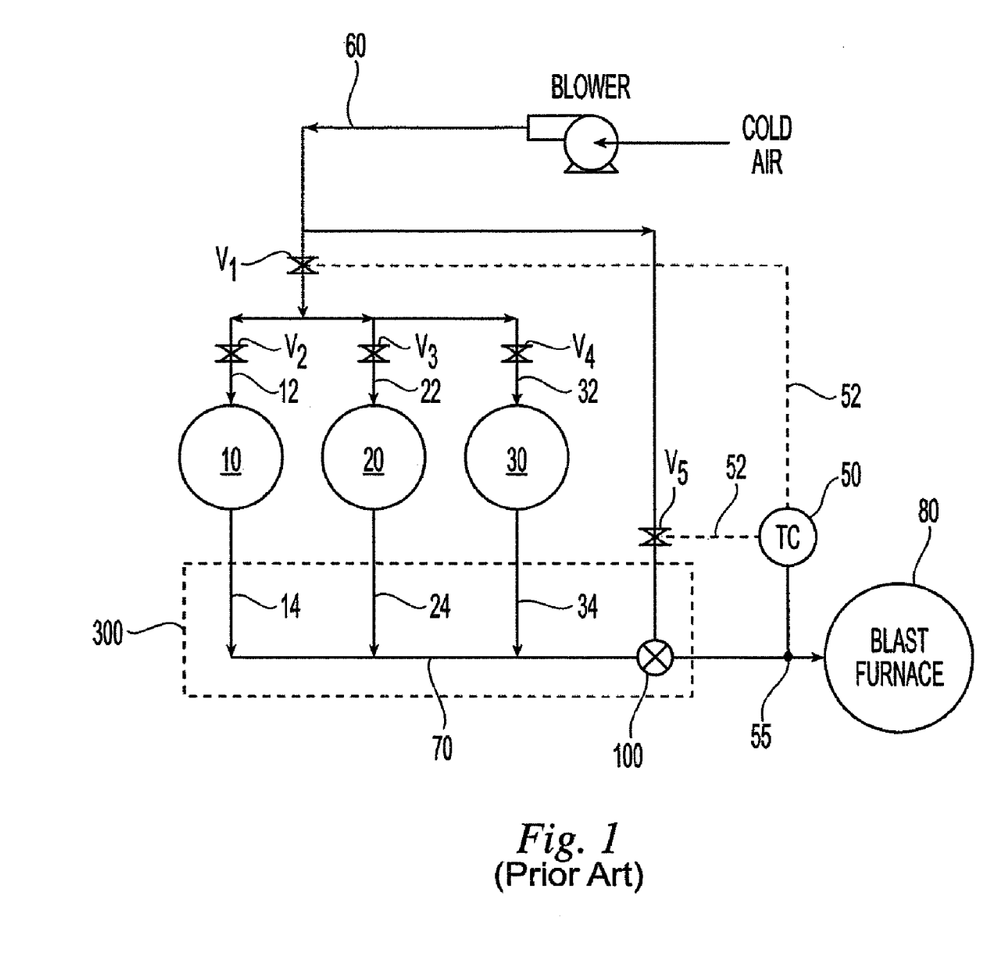
FIG. 1 is a schematic illustration of a conventional blast furnace system showing a typical arrangement.

To help describe the various embodiments of the present invention, a conventional blast furnace system will be first described. FIG. 1 is a schematic illustration of a conventional blast furnace system having stoves 10, 20, 30. Blast furnace systems generally have a plurality of stoves and usually three or more The stoves heat the cold air (cold blast) that supplies the oxygen to convert the carbon in the coke to carbon monoxide and heat required for the transformation of iron ore to molten iron. The heated air supplied to the blast furnace is known as hot blast. The cycles of the stove heating process are: 1) heating the refractory brickwork (checkers) known as "on heat", and 2) heating the cold blast known as "on blast". During the on heat cycle, the stoves burn combustion fuel, generally excess blast furnace gas, in their combustion chambers to heat the stoves' checkers. The cold blast from the cold blast main 60 enters the stoves 10, 20, 30 via supply lines 12, 22, 32 and heated by the checkers and exit from the stoves as hot blasts via connecting lines 14, 24, 34, respectively. Generally, in most blast furnace systems, since only one stove is "on blast" at any given time, stove supply line shut-off valves V2, V3, V4 are used to shut off the supply of cold blast into the stoves that are not blasting. The flow rate of the cold blast into the stoves is adjusted by an undercut valve V1.

The hot blast leaving the stoves enter the hot blast main 70 which delivers the hot blast to the blast furnace 80, usually via a bustle pipe (not shown). The exit temperature of the hot blast leaving the stoves may be about 2000° F. which is higher than the desired hot blast temperature, the set point temperature, for blast furnaces which may be about 1800°. Since the exit temperature of the stoves is higher than the set point temperature of the hot blast, the hot blast is tempered using the cold blast (usually at about 250° F.). To do this, a portion of the cold blast from the cold blast main 60 is diverted and directly mixed into the hot blast main 70, down stream from the stoves, at a spider mixer 100. A spider mixer 100 injects the cold blast air using injection points arranged around the circumference of the hot blast main 70 and enables uniform mixing of the cold air with the hot air. The spider mixer 100 is generally utilized at this mixing point because there is not enough hot blast main before reaching the blast furnace to allow uniform mixing of the cold and hot air if the cold air were injected into the hot blast main by a single injection point, for example. A cold blast mixer valve V5 adjusts the flow rate of the cold blast being mixed into the hot blast main 60. A temperature control unit 50 monitors the hot blast temperature at the blast furnace entrance point 55 (usually at the entrance of the bustle pipe) and controls the cold blast mixer valve V5 to temper the hot blast temperature to the desired set point temperature at the blast furnace entrance point 55. The cold blast mixer valve V5 and other valves disclosed herein may be motor-driven, pneumatically-driven or hydraulically driven. The communication link between the temperature control unit 50 and the valves, illustrated graphically by dotted lines 52, may be a wired link or a wireless link. Tempering of the hot blast temperature is also required because the temperature of the hot blast from the stoves vary during the duration of the stoves' blast cycle. The hot blast leaving the stoves is the hottest at the start of a blast cycle and coolest near the end of a blast cycle. For example, in the conventional blast furnace system described above, the stove's exit temperature may start at about 2000° F. at the beginning of the stove's blast cycle but may have cooled down to a temperature of about 1850° F. by the end of its blast cycle. When the stove's exit temperature cools down to some predetermined level, another stove goes on its blast cycle and the cooled stove will be on heat cycle.

In many hot blast furnace systems, the temperature control unit 50 also controls the undercut valve V1. Thus, the flow rate of the cold blast through the stoves and the flow rate of the cold blast at the cold blast mixer valve V5 can be controlled to temper the hot blast temperature. For example, the undercut valve V1 restricts the flow of air to the stoves which causes a higher upstream pressure. This higher pressure forces more flow through the cold blast mixing line. The cold blast mixer valve V5 opens on high blast temperature. When it is wide open, the undercut valve V1 begins to close to help maintain the hot blast temperature. As the hot blast temperature falls during the stove blast cycle, the undercut valve V1 will open and then the cold blast mixer valve V5 will close. The valves typically operate from a same controller over a split signal range.

But, as the blast furnace stoves deteriorate over time, the stoves' ability to heat deteriorates and the temperature of the hot blast exiting the stoves will gradually drop until the temperature of the hot blast is too low to properly maintain the desired hot blast temperature at the blast furnace entrance point 55. Especially, tempering with cold blast mixer shortens the "on blast" cycle because a minimum amount of cold blast is always flowing through the cold mixing valve.

According to a preferred embodiment of the present invention, a portion of the cold blast is diverted and preheated to be used for tempering the hot blast air to compensate for the deteriorating blast furnace stoves and, thus, extend the life of the stoves before they must be repaired. The preheated cold blast replaces the conventional cold blast mixer arrangement for tempering the hot blast temperature. In another embodiment of the present invention, the preheated cold blast may be used in conjunction with the conventional cold blast mixer arrangement.

Figure 2:
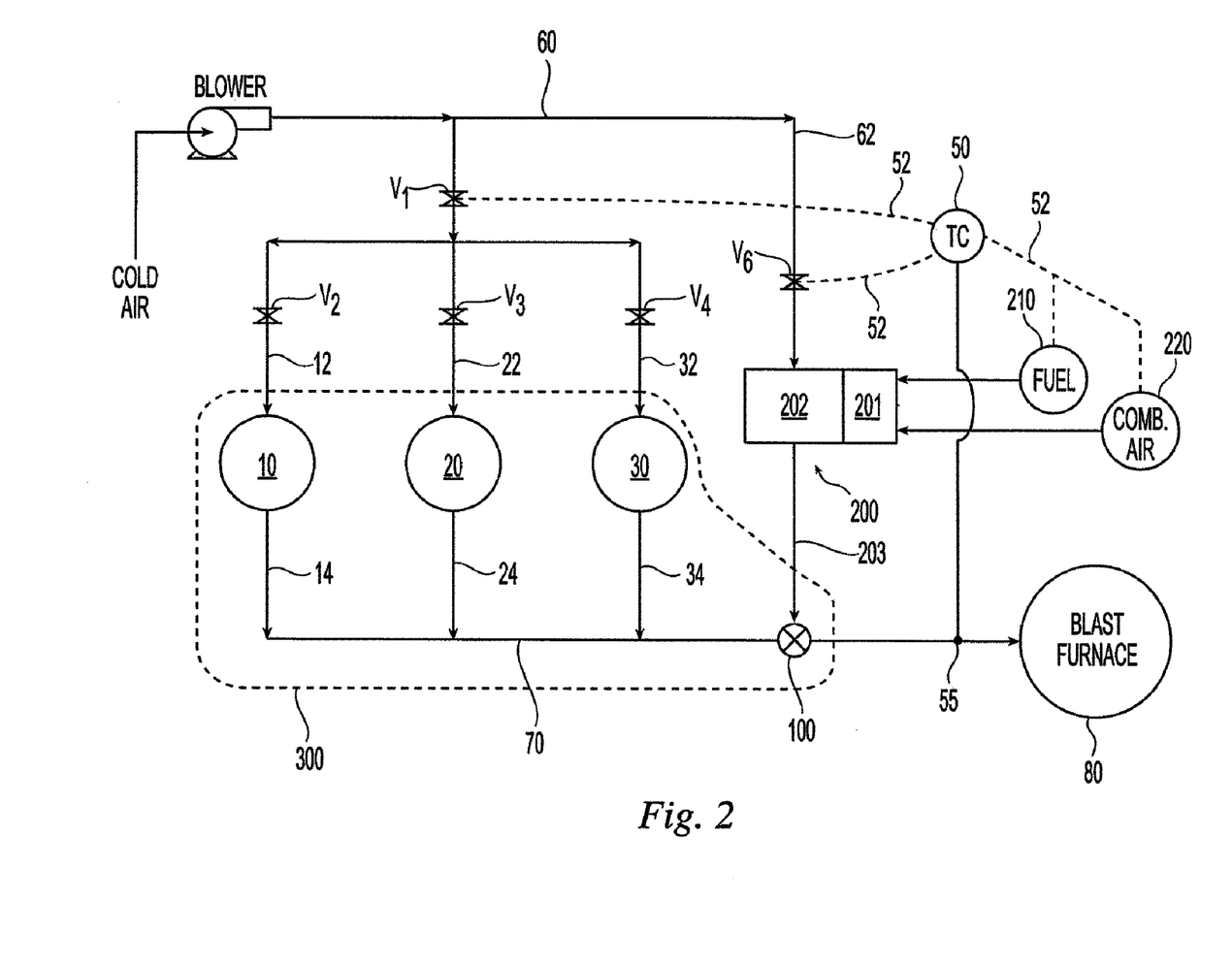
FIGS. 2 through 5 are schematic illustrations of blast furnace systems according to various embodiments of the present invention.

FIG. 2 is a schematic illustration of an improved blast furnace system according to an embodiment of the present invention where the preheated cold blast air replaced the conventional cold blast mixer arrangement. In this embodiment of the present invention, a cold blast preheater 200 is added between the cold blast main 60 and the hot blast main 70 to mix the heated air from the preheater 200 into the hot blast main 70. The heated air from the preheater 200 exits the preheater's outlet pipe 203 and is added to the hot blast main 70 downstream from the stoves. A spider mixer 100 may be used to inject the heated air into the hot blast air if there is not sufficient length of hot blast main 70 before reaching the blast furnace 80 to ensure a uniform mixing of the heated air and the hot blast air.

Figure 11:
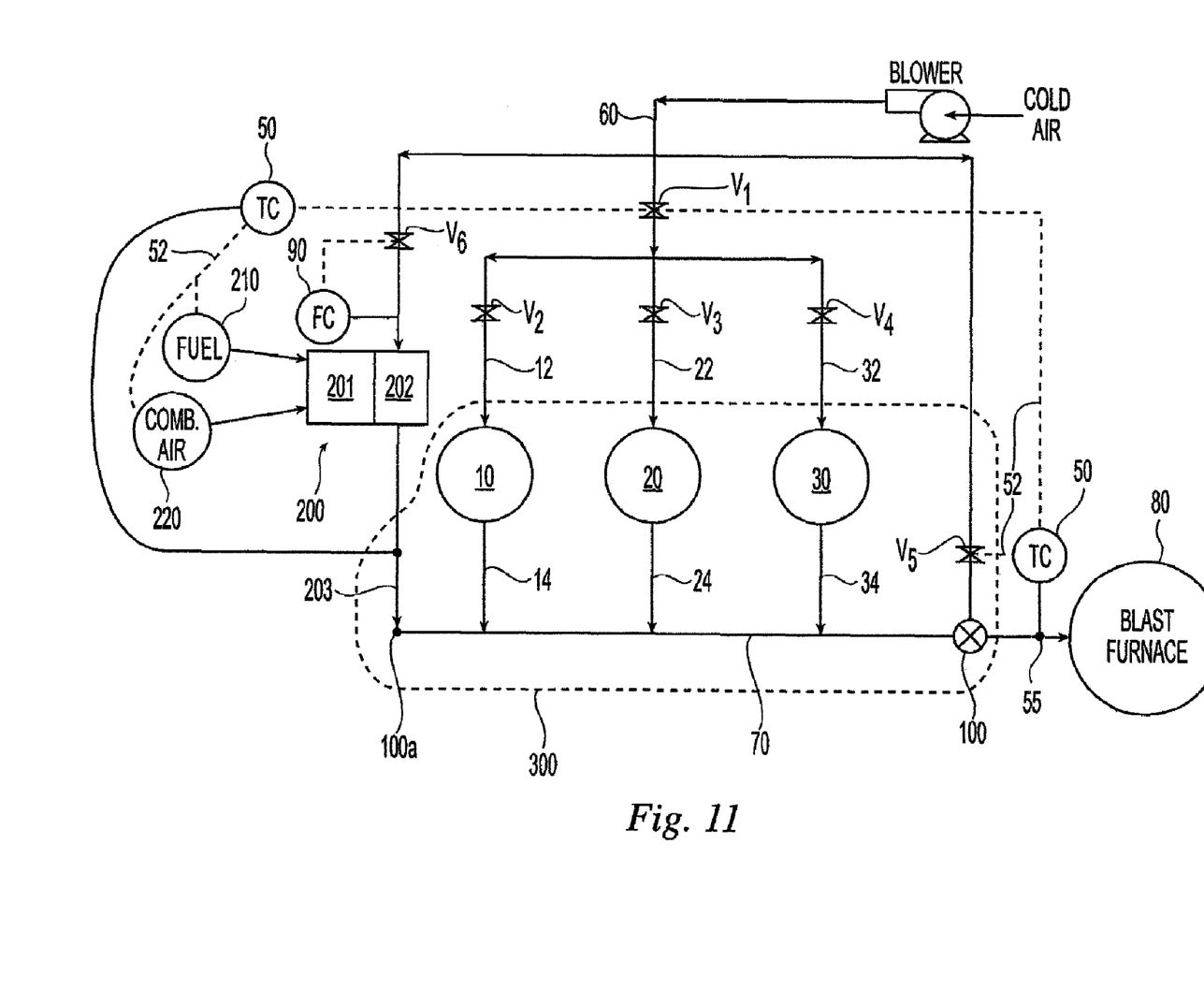
FIG. 11 is a schematic illustration of a blast furnace system according to another embodiment of the present invention.

According to a preferred embodiment of the present invention, the preheater 200, illustrated in FIG. 11, comprises a combustion chamber 201 and a heat exchanger 202. Combustion air 220 and fuel 210 are continuously supplied to the combustion chamber 201 in a controlled manner where the fuel 210 is combusted to generate hot combustion gases inside the preheater 200. A portion of the cold blast diverted from the cold blast main 60 enters the heat exchanger 202 of the preheater 200 via a cold blast supply pipe 62. The flow of the cold blast into the preheater 200 may be controlled by a preheater supply valve V6. In the heat exchanger 202, the diverted cold blast air is heated by the heat from the combustion chamber 201 and exit as heated air via the preheater's outlet pipe 203. The temperature control unit 50 also monitors the temperature of the preheater's heated air and adjusts the supply of the fuel 210 and combustion air 220 to maintain the temperature of the heated air at a desired level appropriate for tempering the hot blast. The preheater 200 is preferably designed so that the temperature of the heated air may be set to any temperature in the range of about 600 to 1600° F. Because the stoves' performance will continue to deteriorate, requiring additional heat input from the preheater 200, the preheater's ability to generate heated air in a range of temperatures allows the blast furnace system to adapt to the changes in the hot blast temperature of the stoves.

The preheater 200 may be a continuously fired heat exchanger that is fueled by the excess blast furnace gas to heat the diverted cold blast air. The blast furnace gases are generally low heating value fuel having about 90 BTU/ft$^3$. According to another aspect of the present invention, however, fuels other than the excess blast furnace gas may be used to fuel the preheater 200 as long as the fuel has sufficient BTU to achieve the desired temperature for the heated air. For example, coke oven gas (nominal 500 BTU/ft$^3$), natural gas (nominal 1000 BTU/ft$^3$), Basic Oxygen Furnace offgas (nominal 100 BTU/ft$^3$), low BTU coal gasifier gas (nominal 100 to 300 BTU/ft$^3$), petcoke gasifier gas (nominal 100 to 300 BTU/ft$^3$), or a combination thereof may be used to fuel the preheater 200. In some cases, waste fuels such as waste oil, coal tar, coal fines or coke breeze, individually or in combination may be used. These other fuels may be used alone as the fuel for the preheater 200 or used to enrich the excess blast furnace gas. The use of the waste fuels may require, however, a special burner and additional environmental controls.

In the preheater's heat exchanger 202, the cold blast air passes through in a counter current manner through two sets of U-tube bundles 205 connected in series. Cold air enters on the exhaust side of the preheater and travels towards the combustion side of the preheater 200. Cold blast air travels through the inside of the tubes while hot combustion gases pass over the outside of the tubes. The exhausted preheater combustion gases may be directed via appropriate flue system (not shown) into one or more of the stoves' exhaust chimneys (not shown) for environmental reasons. It should be noted, however, that the preheater 200 illustrated in FIG. 11 is only an example and many other configurations for a heat exchanger 202 may also be suitable for the preheater 200 of the blast furnace systems according to the present invention. For example, although there are two bundles of U-tube in this particular example, the number of bundles is determined by the economic, thermal and fluid flow design criteria for the heat exchanger in a particular application.

To ensure that the hot blast temperature is at a desired set temperature, a temperature control unit 50 monitors the temperature at the entrance point 55 of the blast furnace and uses that information to control the undercut valve V1 and the preheater supply valve V6 to adjust the flow of cold blast air into the stoves 10, 20, 30 and the preheater 200, respectively. Furthermore, the temperature control unit 50 may monitor the temperature of the preheater's heated air at the outlet pipe 203 and moderate the supply of the fuel 210 and the combustion air 220 to help maintain the hot blast at the desired set temperature. For example, in a blast furnace system where the stoves have deteriorated to a point where the stoves' hot blast exit temperature starts at about 1400° F. at 50,000 scfm at the beginning of their blast cycle, to supply the blast furnace with hot blast set temperature of about 1200° F. at 100,000 scfm, the preheater 200 may be maintained to produce heated air of about 1000° F. at 50,000 scfm. As the stoves deteriorate with age and the stoves' maximum hot blast exit temperature continually fall, the output temperature of the preheater's heated air may be raised to maintain the hot blast at the desired set temperature. Thus, in the improved blast furnace systems of the present invention, the operational life of the stoves may be extended between the repairs.

Figure 3:
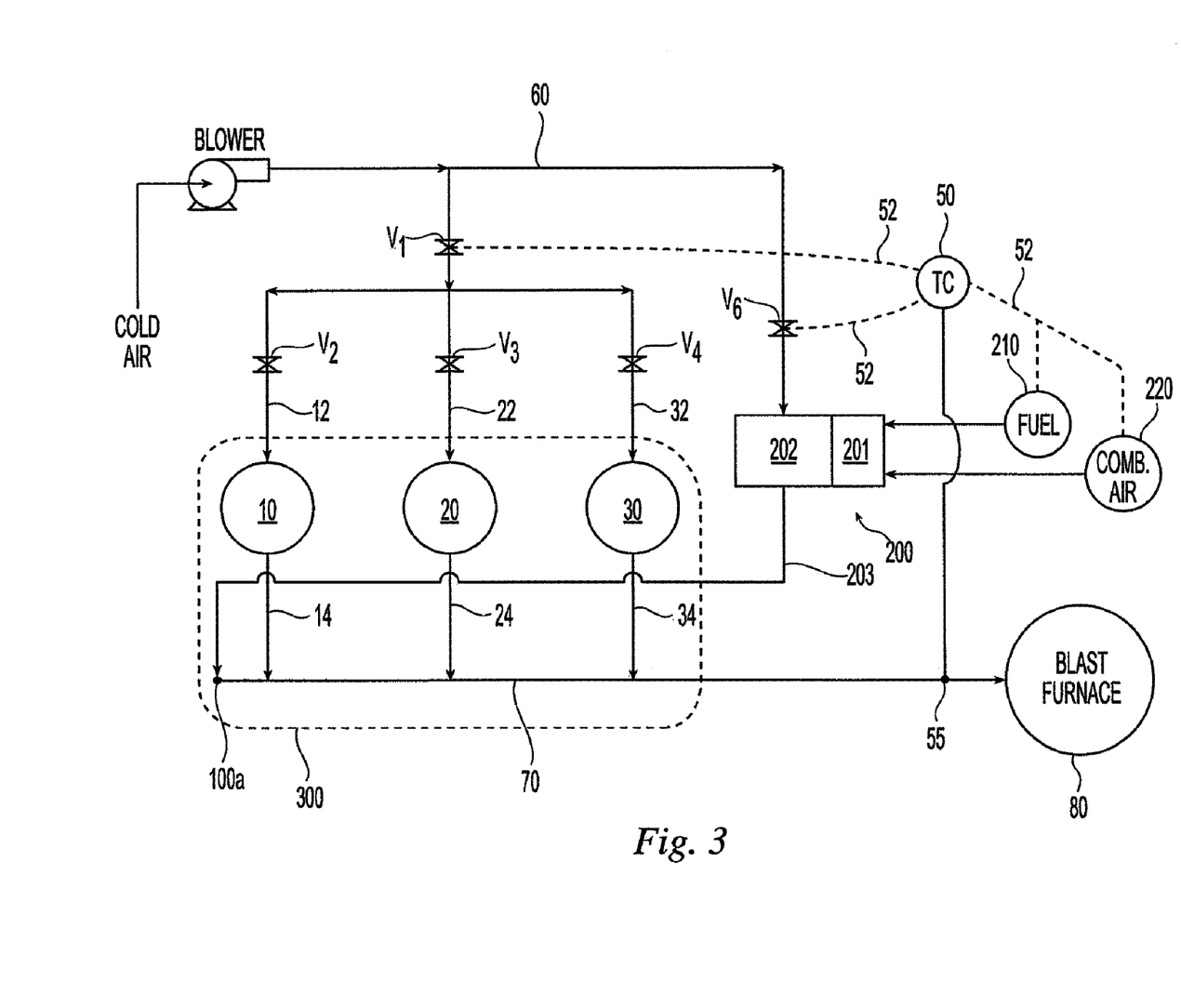

According to another aspect of the present invention, the heated air from the preheater 200 may be introduced into the hot blast system 300 of the blast furnace system at any point that is appropriate for the needs of the particular blast furnace system. A blast furnace system's hot blast system 300 comprises the hot blast main 70, the stoves 10, 20, 30, and the stoves' connecting lines 14, 24, 34. In other words, the heated air from the preheater 200 does not have to be mixed into the hot blast system 300 at the mixing point illustrated in the blast furnace system of FIG. 2, namely into the hot blast main 70 downstream from the stoves 10, 20, 30. For example, in an embodiment of the present invention illustrated in FIG. 3, the mixing point or the entry point 100*a* of the heated air from the preheater 200 into the hot blast system 300 is in the hot blast main 70 at a point upstream from the stoves 10, 20, 30. When mixing the heated air from the preheater 200 directly in to the hot blast main 70, the entry point may be anywhere along the length of the hot blast main 70 as appropriate.

Figure 4:
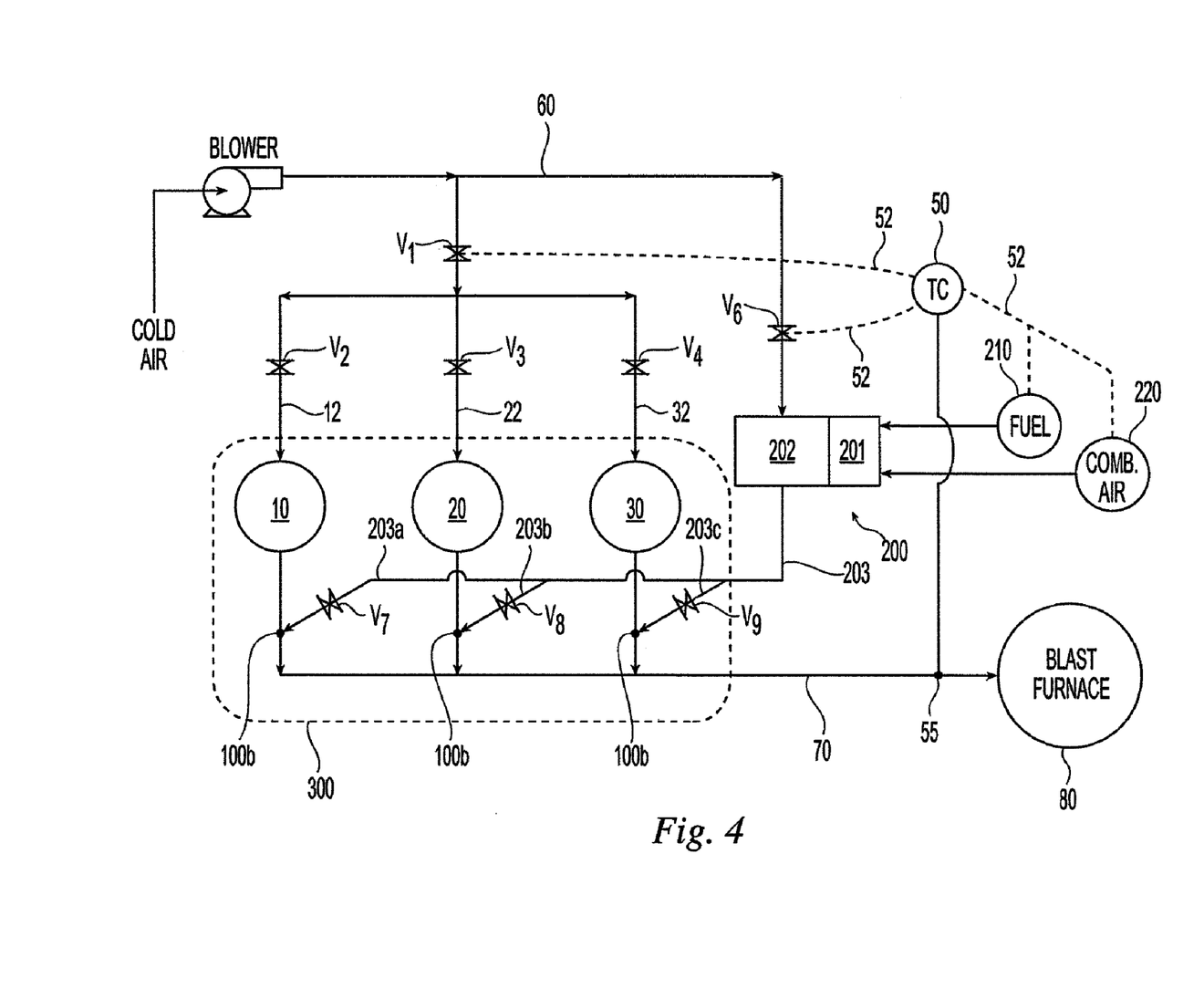

According to another embodiment of the present invention illustrated in FIG. 4, the heated air from the preheater 200 may be mixed into the hot blast system 300 by injected into the connecting lines 14, 24, 34 of the stoves 10, 20, 30, respectively, between the stoves and the hot blast main 70. The outlet pipe 203 of the preheater 200 is branched and joined into the connecting lines 14, 24, 34 of the stoves. Each of the branches 203*a*, 203*b*, 203*c* of the outlet pipe 203 would have shut-off valves V7, V8, and V9, respectively, that are synchronized with the stove supply line shut-off valves V2, V3, and V4, respectively, so that the heated air from the preheater 200 is mixed into the hot blast air of the stove that is in its blast cycle.

Figure 5:
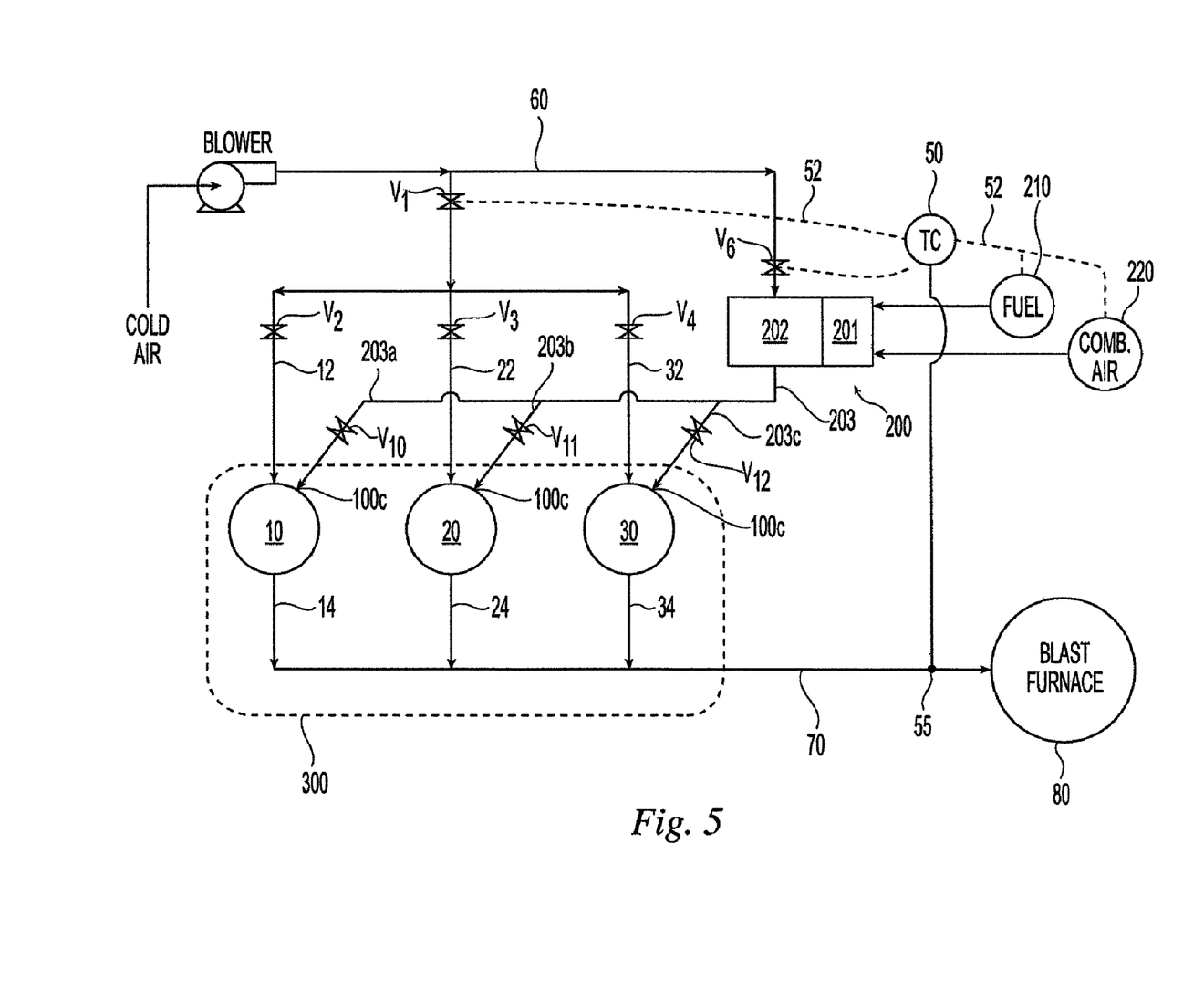

In yet another embodiment of the present invention, the heated air from the preheater 200 may be mixed into the hot blast system 300 by being introduced into the stoves' combustion chamber during the stoves' blasting cycle. The blast furnace system of FIG. 5 illustrates this example. However, FIG. 5 is only a schematic illustration and the branches 203*a*, 203*b*, and 203*c* of the preheater's outlet pipe 203 are shown as connected to the stoves 10, 20, 30, respectively, but the details of the stoves' combustion chambers are not shown. The structures of blast furnace stoves are well known in the art and, thus, it suffices to mention that the preheater's outlet pipe branches 203a, 203b, and 203c may be connected to the combustion chamber of the stoves 10, 20, 30 just below the stoves' hot blast outlet lines 14, 24, 34, respectively. That particular location is particularly suitable for some blast furnace systems where the conventional cold blast mixing is done by such a connection. The heated air from the preheater 200 is introduced into the combustion chamber of the stoves during the particular stove's blasting cycle so that the heated air from the preheater 200 and the hot blast air from the checkerbrick will mix before the hot blast exits the stove. Each of the preheater's outlet pipe branches 203a, 203b, and 203c are provided with shut-off valves V10, V11, and V12, respectively, that are synchronized with the stoves's supply line shut-off valves V2, V3, and V4, respectively. These valves are synchronized so that the heated air from the preheater 200 is mixed into the particular stove that is in its blasting cycle. All of the valves mentioned herein may be motor-driven, pneumatically-driven or hydraulically driven.

Figure 6:
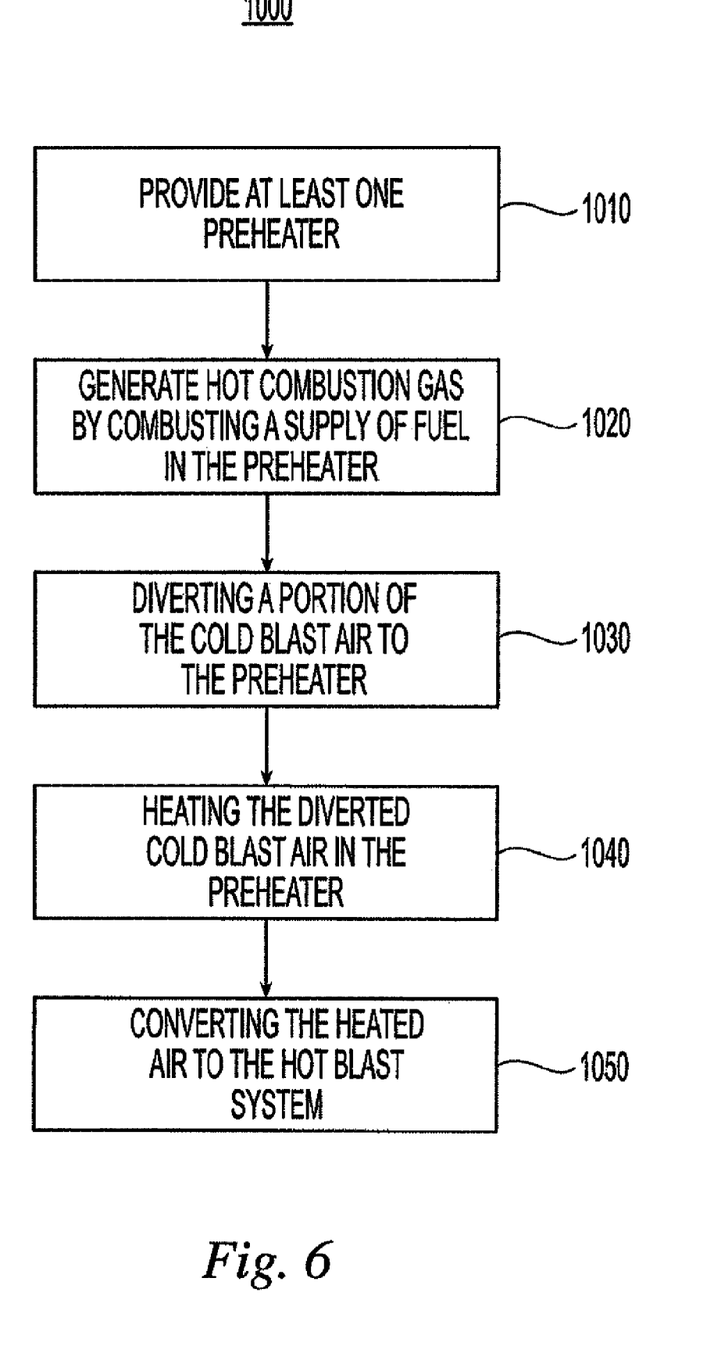
FIG. 6 is a flow chart of a method of tempering the hot blast temperature of a blast furnace system according to an embodiment of the present invention.

According to another aspect of the present invention, FIG. 6 illustrates in a flow chart 1000, a novel method of tempering the hot blast temperature of the blast furnace systems of FIGS. 2 through 5. In this method the hot blast temperature of a blast furnace system is tempered by mixing preheated cold blast air into the blast furnace system's hot blast system.

At step 1010, at least one cold blast air preheater is provided between the cold blast main and the hot blast system of the blast furnace system in parallel with the stoves.

At step 1020, hot combustion gas is continuously generated in the preheater by combusting a supply of fuel.

At step 1030, a portion of the cold blast air is diverted to the preheater.

At step 1040, the diverted cold blast air is heated in the preheater by the hot combustion gas.

At step 1050, the heated air is conveyed to the hot blast system of the blast furnace system to temper the hot blast temperature to a desired set point.

Figure 7:
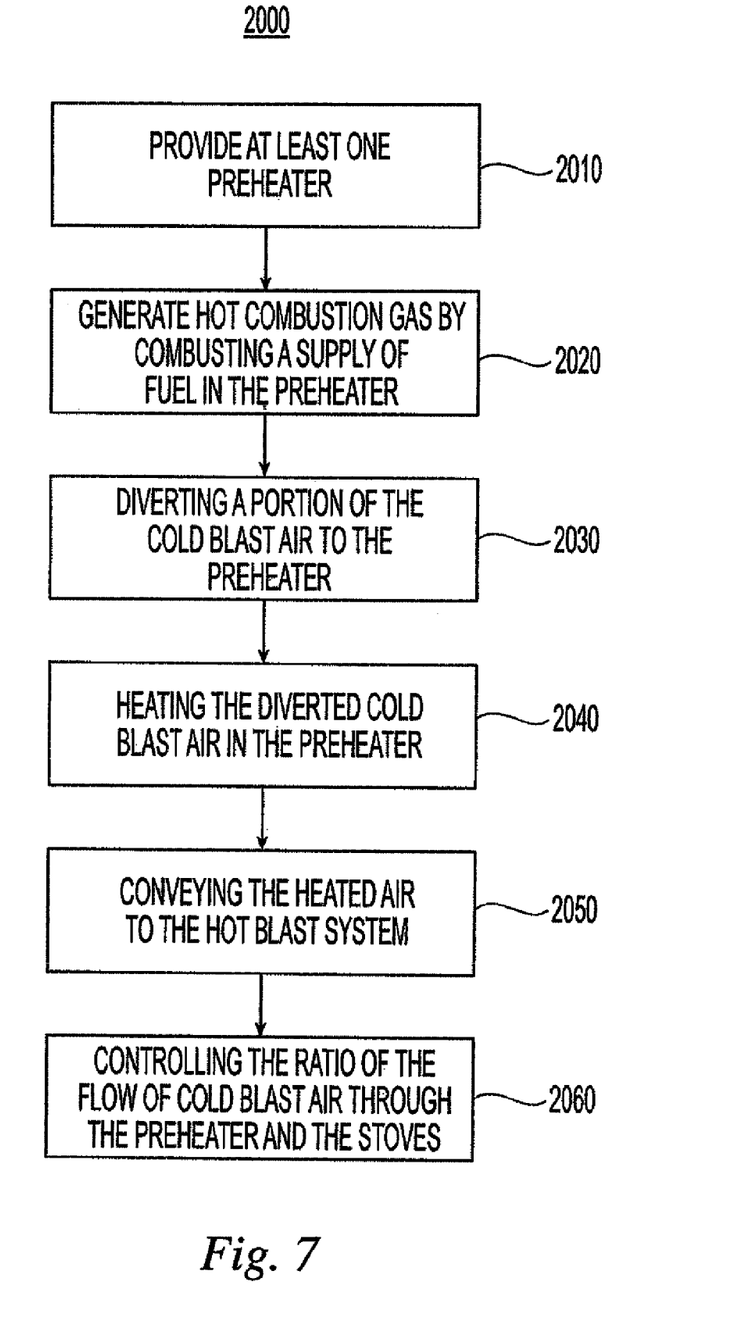
FIG. 7 is a flow chart of a method of tempering the hot blast temperature of the blast furnace systems of FIGS. 2 through 5.

FIG. 7 is a flow chart 2000 illustrating a method of tempering the hot blast temperature of the improved hot blast furnace systems of FIGS. 2 through 5, according to another embodiment of the present invention.

At step 2010, at least one cold blast air preheater is provided between the cold blast main and the hot blast system of the blast furnace system in parallel with the stoves.

At step 2020, hot combustion gas is continuously generated in the preheater by combusting a supply of fuel.

At step 2030, a portion of the cold blast air is diverted to the preheater.

At step 2040, the diverted cold blast air is heated in the preheater by the hot combustion gas.

At step 2050, the heated air is conveyed to the hot blast system of the blast furnace system.

At step 2060, the ratio of the flow of the cold blast air through the preheater and the flow of the cold blast air through the stoves is controlled to temper the hot blast temperature to a desired set point.

Figure 8:
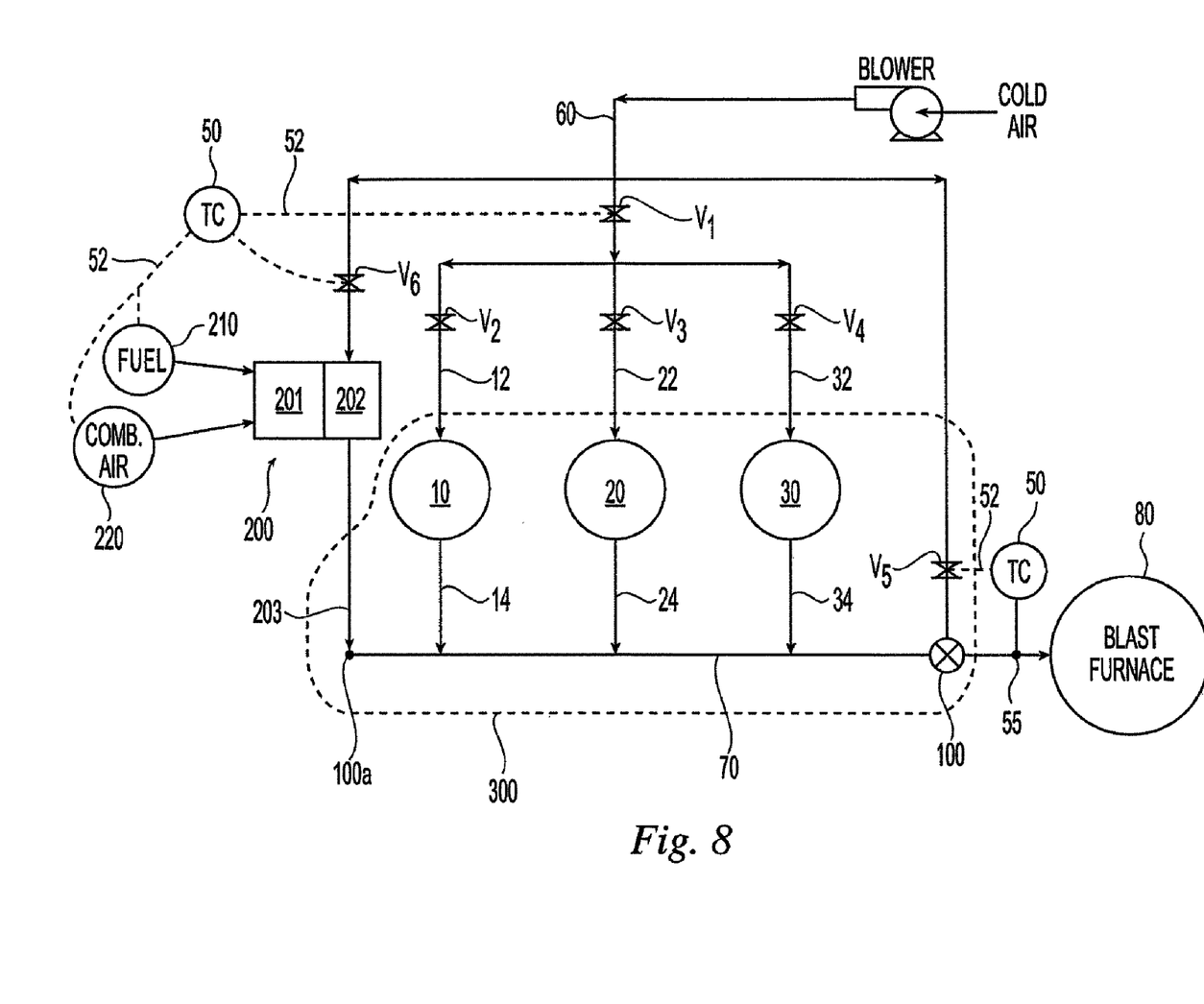
FIG. 8 is a schematic illustration of a blast furnace system according to another embodiment of the present invention.

According to another embodiment of the present invention, FIG. 8 illustrates a blast furnace system in which the cold blast preheater 200 as well as the conventional configuration of mixing the cold blast air directly into the hot blast main are both provided in a blast furnace system to temper the hot blast temperature. As in the conventional blast furnace system of FIG. 1, cold blast may be directly added to the hot blast main 70 via the cold blast mixer valve V5 into the spider mixer 100. In addition, a preheater 200 is also provided to the blast furnace system in parallel with the cold blast mixer and the stoves 10, 20, 30. In this embodiment of the present invention, the heated air from the preheater 200 is directly mixed into the hot blast main 70 of the hot blast system 300 upstream from the stoves at a mixing point 100a. This is similar to the arrangement of the blast furnace system of FIG. 3, but as mentioned previously, this arrangement of the preheater 200 is only one example and the mixing point for the heated air from the preheater 200 may be at any appropriate point within the hot blast system 300.

Figure 9:
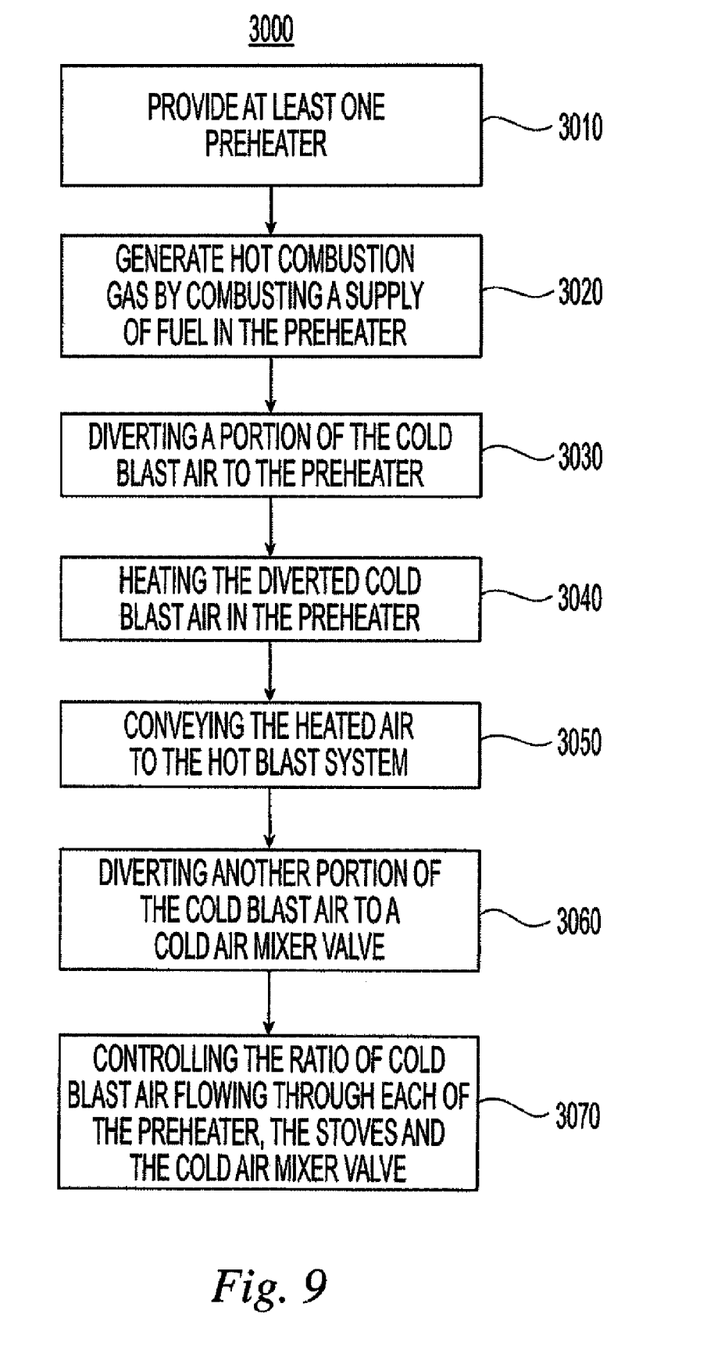
FIG. 9 is a flow chart of a method of tempering the hot blast temperature of the blast furnace system of FIG. 8.
Figure 10:
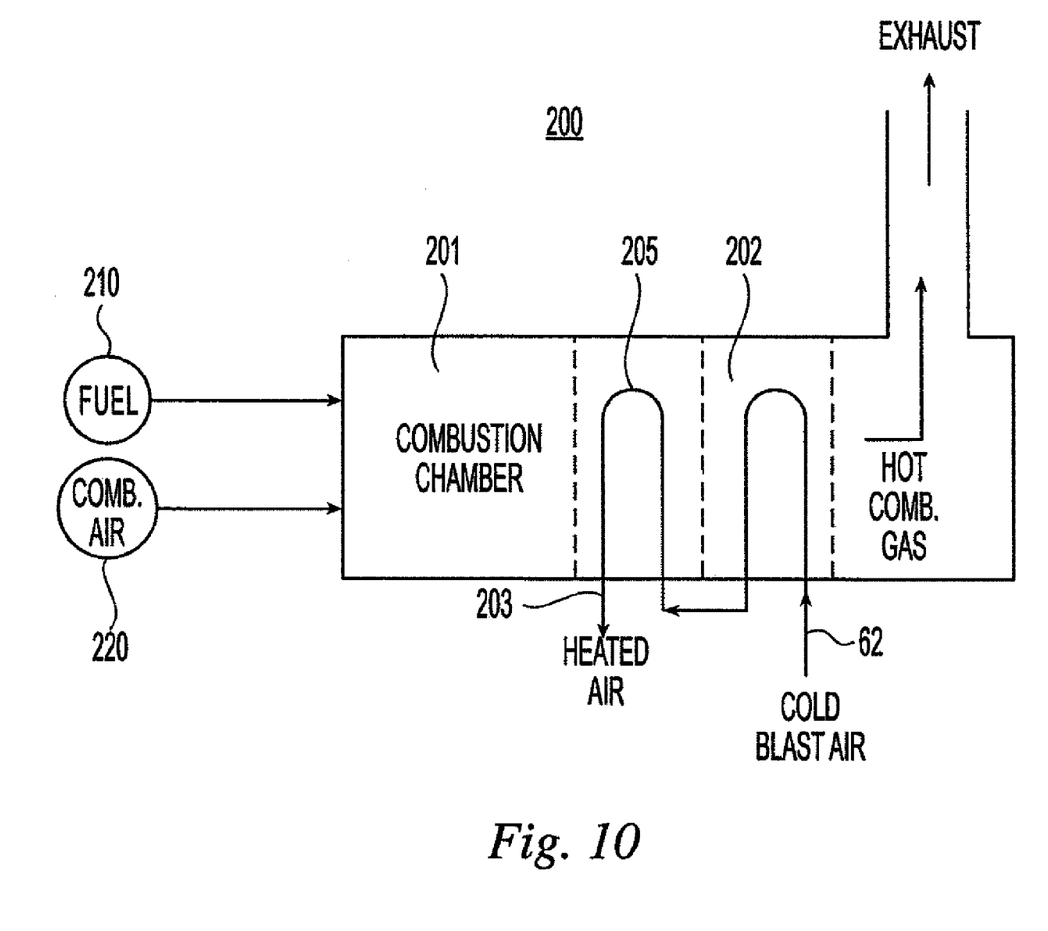
FIG. 10 is a schematic illustration of a cold blast preheater according to an embodiment of the present invention.

FIG. 9 illustrates in a flow chart 3000, a method of tempering the hot blast temperature of a blast furnace system, an example of which is illustrated in FIG. 8, according to another embodiment of the invention.

At step 3010, at least one cold blast air preheater is provided between the cold blast main and the hot blast system of the blast furnace system in parallel with the stoves.

At step 3020, hot combustion gas is continuously generated in the preheater by combusting a supply of fuel.

At step 3030, a portion of the cold blast air is diverted to the preheater.

At step 3040, the diverted cold blast air is heated in the preheater by the hot combustion gas.

At step 3050, the heated air is conveyed to the hot blast system of the blast furnace system.

At step 3060, another portion of the cold blast air is diverted to a cold air mixer valve.

At step 3070, the ratio of cold blast air flowing through each of the preheater, the stoves and the cold air mixer valve is controlled to temper the hot blast temperature to a desired set point.

Because the preheater 200 is incorporated into a blast furnace system in parallel with the stoves 10, 20, 30 and the preheater 200 is intended to operate in a regime where at least one of the stoves is in blasting mode, preferably, the pressure drop through the preheater 200 is at or below the pressure drop across the stoves. If the pressure drop through the preheater 200 and the pressure drop through the stoves are substantially different, the flow of the cold blast through the preheater 200 or the stoves may be impaired. The pressure drop through the preheater 200 is maintained in balance with the stoves by controlling the preheater supply valve V6, primarily ,and the undercut valve V1, secondarily.

According to another aspect of the present invention, in the various embodiments of the invention discussed herein, the cold blast preheater 200 may be set to operate at a fixed flow rate. This is illustrated in FIG. 11. In FIG. 11, the blast furnace system is provided with both a conventional cold blast mixer valve V5 and a cold blast preheater 200. The cold blast preheater 200 may be set to operate at a fixed flow rate and temperature A flow control unit 90 maintains the flow of air through the cold blast preheater 200 at a predetermined fixed rate. The temperature control unit 50 monitors the temperature of the heated air in the outlet pipe 203 and adjusts the supply of fuel 210 and combustion air 220 to adjust the temperature of the heated air as necessary. The temperature control unit 50 also controls the mixing of the cold blast air at the spider mixer 100 by controlling the cold blast mixer valve V5. By adjusting the cold blast mix at the spider mixer 100 and the temperature of the heated air from the preheater 200, the temperature controller maintains the hot blast temperature at the blast furnace entrance point 55. Alternatively, the temperature of the heated air from the preheater 200 may be kept at a fixed temperature and maintain the hot blast temperature at the hot blast entrance point 55 by tempering with the cold blast mix at the spider mixer 100.

In all of the embodiments of the present invention described herein, the flow of air through the cold blast preheater(s) 200 and the stoves needs to be controlled because pressure drop through each of the stoves can vary substantially. If the air flows are not controlled as the pressure drop through the stoves changes, the temperature of the heated air from the cold blast preheater(s) 200 will fluctuate accordingly and would affect the ability to temper the temperature of the hot blast to a desired set temperature.

Figure 12:
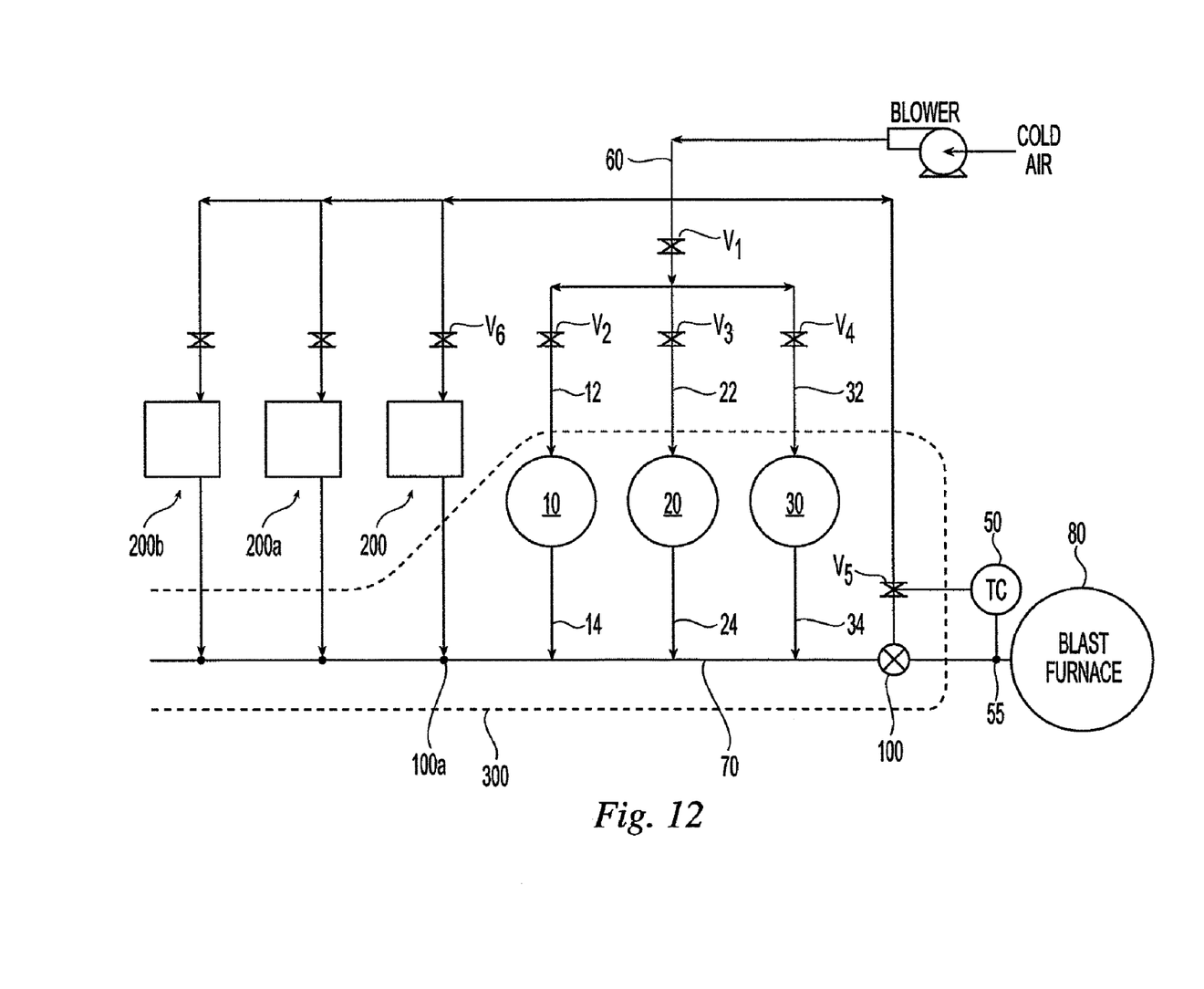
FIG. 12 is a schematic illustration of a blast furnace system according to an embodiment of the present invention utilizing a plurality of cold blast preheaters.

In the blast furnace systems of the various embodiments of the present invention discussed herein, a plurality of cold blast preheaters may be utilized if necessary. Illustrated in FIG. 12 is a blast furnace system similar to the embodiment of FIG. 8. However, in this embodiment of the present invention, two or more preheaters 200, 200a, 200b, . . . , etc. are provided. This is also applicable to the other embodiments of the present invention illustrated in FIGS. 2 through 5, 8, and 11.

Furthermore, although the cold blast preheater 200 is described as being continuously operating in the various embodiments of the present invention described above, if appropriate, the preheater 200 may be turned on only when necessary to supplement the stoves.

The preheater's spent combustion gases may be exhausted to an existing stove chimney (not shown) for environmental reasons or to its own stack. If its own self-standing chimney stack is used, the height of the stack should be high enough so that any downdraft of the flue gas does not affect surrounding buildings or people. Another consideration is the amount of natural draft. The combustion fan on the preheater is designed to overcome the pressure drop of the burner and the tube bundles. If there is not natural draft, additional power will be needed to push the flue gases out the stack. While the foregoing invention has been described with reference to the above embodiments, various modifications and changes can be made without departing from the spirit of the invention. Accordingly, all such modifications and changes are considered to be within the scope of the appended claims.

What is claimed is:

1. A blast furnace system for producing molten iron comprising:
    a blast furnace;
    a hot blast main for conveying a supply of hot blast to the blast furnace;
    a plurality of stoves for heating a supply of cold blast and generating the hot blast;
    a cold blast main for conveying a supply of cold blast to the plurality of stoves;
    at least one cold blast preheater, provided between the cold blast main and the hot blast main for heating a portion of the cold blast that has been diverted to the preheater before reaching the stoves into heated air output, said preheater comprising a combustion chamber in which a continuous supply of combustion air and fuel are combusted generating hot combustion gases; and
    a temperature control unit operatively configured to monitor the temperature of the preheater's heated air output and adjust the supply of combustion air and fuel to the preheater to maintain the temperature of the heated air output at a desired level for tempering the hot blast, wherein the heated air is mixed with the hot blast to temper the hot blast temperature.

2. The blast furnace system of claim 1, wherein the preheater further comprises a plurality of heat exchanger tubes for transferring heat energy from the hot combustion gases to the diverted cold blast.

3. The blast furnace system of claim 1, wherein the heated air is injected into the hot blast main upstream from the stoves.

4. The blast furnace system of claim 1, wherein the heated air is injected into the hot blast main downstream from the stoves.

5. A method for tempering hot blast temperature of a blast furnace system, the blast furnace system comprising a plurality of stoves for heating cold blast air for providing a supply of hot blast air to the blast furnace, the method comprising the steps of:
    providing at least one preheater to supplement the stoves;
    combusting a supply of fuel in the preheater to provide a feed of hot combustion gases inside the preheater;
    diverting a portion of the cold blast air to provide a feed of cold blast air to the preheater;
    heating the diverted cold blast air in the preheater by the hot combustion gases; and
    conveying the heated cold blast air to the blast furnace system's hot blast system, whereby tempering the hot blast temperature of the blast furnace system.

6. The method of claim 5, wherein the step of combusting a supply of fuel in the preheater to provide a feed of hot combustion gases inside the preheater comprises continuously combusting the supply of fuel in the preheater.

7. The method of claim 5, wherein the step of conveying the heated air to the hot blast system comprises conveying the heated air to hot blast main of the blast furnace, wherein the heated air mixes with hot blast air from the stoves.

8. The method of claim 7, wherein the heated air is conveyed to the hot blast main upstream of the stoves.

9. The method of claim 7, wherein the heated air is conveyed to the hot blast main downstream of the stoves.

10. The method of claim 5, wherein the step of conveying the heated air to the hot blast system comprises mixing the heated air with hot blast air from the stoves before the hot blast air from the stoves enters hot blast main of the blast furnace system.

11. The method of claim 10, wherein the heated air is mixed with the hot blast air from the stoves between the stoves and the hot blast main.

12. The method of claim 10, wherein the heated air is mixed with the hot blast air from the stoves within the stoves' combustion chamber.

13. The method of claim 5, further comprising a step of controlling the ratio of the flow of cold blast air through the preheater and through the stoves.

14. The method of claim 5, further comprising steps of:
    diverting another portion of the cold blast air to a cold blast mixer valve; and
    controlling the ratio of cold blast air flowing through each of the preheater, the stoves, and the cold air mixer valve.

15. The method of claim 5, wherein the preheater comprises a plurality of heat exchanger tubes and the step of heating the diverted cold blast air comprises:

conveying the diverted cold blast air through the preheater within the heat exchanger tubes while passing the hot combustion gases over the outer surface of the heat exchanger tubes.

16. The method of claim 15, wherein the step of heating the diverted cold blast air comprises heating the cold blast air to a temperature of between about 600 to 1600° F.

17. The method of claim 5, wherein the fuel comprises excess blast furnace gas, coke oven gas, natural gas, Basic Oxygen Furnace offgas, low BTU coal gasifier gas, petcoke gasifier gas, or a combination thereof.

18. The method of claim 5, further comprising:

monitoring the temperature of the heated cold blast air exiting the preheater; and     adjusting the supply of fuel and combustion air being supplied to the preheater to maintain the temperature of the heated cold blast air at a desired level appropriate for tempering the hot blast.

\* \* \* \* \*